United States Patent [19]
Jones, Jr. et al.

[11] 3,920,576
[45] Nov. 18, 1975

[54] DOPING OF NEMATIC LIQUID CRYSTAL
[75] Inventors: Freeman B. Jones, Jr., Westlake Village; Roger Chang; Edward P. Parry, both of Thousand Oaks, all of Calif.
[73] Assignee: Rockwell International Corporation, El Segundo, Calif.
[22] Filed: May 7, 1973
[21] Appl. No.: 357,566

[52] U.S. Cl. .......... 252/299; 252/408 LC; 350/150; 350/160 LC
[51] Int. Cl.$^2$ ...................... C09K 3/34; C09K 3/00; G01N 31/00; G01N 33/00
[58] Field of Search ...... 252/408, 299; 350/160 LC, 350/150; 23/230 LC

[56] References Cited
UNITED STATES PATENTS

| | | | |
|---|---|---|---|
| 3,597,043 | 8/1971 | Dreyer | 350/150 |
| 3,655,270 | 4/1972 | Greagh | 350/160 LC |
| 3,675,987 | 7/1972 | Rafuse | 252/299 |
| 3,687,515 | 8/1972 | Haas et al. | 252/299 |
| 3,697,150 | 10/1972 | Wysochi | 252/408 |
| 3,756,694 | 9/1973 | Soree et al. | 252/408 |
| 3,803,050 | 4/1974 | Haas et al. | 350/160 LC |
| 3,814,700 | 6/1974 | Aviram et al. | 252/408 |
| 3,816,113 | 6/1974 | Haas et al. | 252/408 |
| 3,838,059 | 9/1974 | Wong | 252/299 |

*Primary Examiner*—Benjamin R. Padgett
*Assistant Examiner*—T. S. Gron
*Attorney, Agent, or Firm*—H. Fredrick Hamann; G. Donald Weber, Jr.; Robert Ochis

[57] ABSTRACT

A nematic liquid crystal is doped with p-toluenesulfonic acid and a bifunctional material selected from the group consisting of m-aminophenol, p-aminophenol, 3-dimethylaminophenol, 4 amino-m-cresol, 4-hydroxypyridine, and p-aminobenzoic acid. Either of the dopants, p-toluenesulfonic acid or the bifunctional dopant alone increases the contrast ratio of the liquid crystal moderately, from about 1 for the pure Schiff-base material to from 4 to 7 for the doped material. When used in combination, the p-toluenesulfonic acid and the bifunctional dopant together have a much greater effect on the contrast ratio, which is increased to within a range of 11–19 depending on dopant concentrations. The contrast ratio improvement varies within this range for many different proportions, with the p-toluenesulfonic acid being present in concentrations of up to several hundred parts per million (ppm) and the bifunctional material being present in concentrations of up to several weight per cent. The contrast ratio range is adequate for display purposes, however, the cutoff electrical excitation frequency (above which all dynamic scattering ceases) for the doped liquid crystal varies over a range of from about 180 Hertz to 400 Hertz. The addition of the selected dopants to the nematic liquid crystal stabilizes the mixture in the presence of sunlight, oxygen and water, and against electric field deterioration thus reducing the dependence of the final display characteristics on meticulous care in preparing and handling the liquid crystal mixture and on the environment (sunlight and electric field) to which the finished display device is exposed. The preferred liquid crystal mixture is .51 weight % p-aminophenol with 191 ppm p-toluenesulfonic acid in a nematic material such as substantially 55% 4-methoxybenzylidene-4'-n-butyl-aniline and substantially 45% 4-ethoxybenzylidene-4'-n-butylaniline by weight.

6 Claims, No Drawings

DOPING OF NEMATIC LIQUID CRYSTAL

RELATED APPLICATIONS

This application is related to two other applications, each of which was filed on the same day as this application and which are assigned to the assignee of this application. The related applications are "Nematic Liquid Crystals Doped to Raise Their Dynamic Scattering Cutoff Frequency" by Freeman B. Jones, Jr. and "Homeotropic Alignment of Liquid Crystals in a Display Cell by Baked on Ionic Surfactants" by Ronald M. Govan and Freeman B. Jones, Jr. Each of these applications is incorporated herein by reference.

BACKGROUND OF THE INVENTION

1. Field of the Invention

The invention relates to the field of luquid crystals for electronic display applications and more particularly to the field of dopants for improving the overall performance of a luquid crystal display system.

2. Prior Art

Pure nematic liquid crystals have very low contrast ratios when excited by an electric field and thus make poor liquid crystals for use in electronic displays. It has therefore become common practice to dope the liquid crystal with other materials to increase its contrast ratio.

Another problem with pure nematic liquid crystals is that their contrast ratio depends on dynamic scattering and the materials have very low (about 25 Hertz) cutoff frequencies above which all dynamic scattering ceases and there is no display. Such low drive frequencies are difficult to obtain from microelectronic circuits with which many liquid crystal display devices are used. Further at such excitation frequencies an observer perceives flickering or blinking of the display. To make the problem even greater, the cutoff frequency halves for about each 10°C. drop in temperature of the liquid crystal. Thus, if the display is to be used where the temperature may fall to say 5°C. (20°C. less than room temperature) the drive frequency would have to be reduced by a factor of 4 and the display would visually pulsate.

OBJECTS

A primary object of the invention is to increase both the contrast ratio and the cutoff frequency of a liquid crystal display.

Another object is to stabilize the liquid crystal against environmentally induced deterioration.

Other objects and advantages will become apparent from the following description of the preferred embodiments of the invention.

SUMMARY OF THE INVENTION

The invention dopes a nematic liquid crystal with p-toluenesulfonic acid and a bifunctional material selected from the group consisting of m-aminophenol, p-aminophenol, 3-dimethylaminophenol, 4 amino-m-cresol, 4-hydroxypyridine, and p-aminobenzoic acid. The selected dopants increase the contrast ratio and the cutoff frequency of the liquid crystal, while stabilizing the mixture against environmental effects. The preferred liquid crystal mixture comprises 0.51 weight % p-aminophenol and 191 ppm p-toluenesulfonic acid in a liquid crystal such as substantially 55% 4-methoxybenzylidene-4'-n-butylaniline and substantially 45% 4-ethoxybenzylidene-4'-n-butylaniline by weight.

DESCRIPTION OF THE INVENTION

For satisfactory performance in a liquid crystal display cell, a liquid crystal must have a contrast ratio in the neighborhood of eight or higher. The highest possible contrast ratio is considered best, all other things being equal.

For maximum versatility, a wide temperature range of cell operation must be provided, preferably extending at least to 0°C. for use in such items as microelectronic pocket calculators. For aesthetically satisfactory operation, the display cell must not flicker or blink. With a drive frequency of roughly 25 Hertz, a liquid crystal display cell begins to flicker perceptibly. Thus, for a margin of error a minimum drive frequency of 40 Hertz is preferred. Thus at 0°C. the liquid crystal cutoff frequency must be at least 40 Hertz. This requires that the cutoff frequency be 80 Hertz at 10°C., 160 Hertz at 20°C. and 220 Hertz at 25°C. Thus, for aesthetic operation at 0°C. the cutoff frequency must be at least 220 Hertz at 25°C. (room temperature). This however, does not allow for the problems of producing low frequency excitation voltages in microcircuits.

The final requirement for a display cell is that it have a long useful life.

We have discovered that by doping a nematic liquid crystal with a dopant preferably comprising one part by weight of p-toluenesulfonic acid and between about 3.4 and 650 parts by weight of a bifunctional material selected from the group consisting of m-aminophenol, p-aminophenol, 3-dimethylaminophenol, 4-amino-m-cresol, 3-hydroxypyridine, and p-aminobenzoic acid the above goals can be achieved. In order to accomplish these results, the bifunctional material should be present in a quantity in the range of 0.1 to 5.0 weight percent of the liquid crystal and the p-toluenesulfonic acid should be present in a concentration of less than 300 ppm and preferably at less than about 77 ppm of the liquid crystal. The preferred embodiment comprises 0.51 weight percent p-aminophenol and between 180 and 200 ppm p-toluenesulfonic acid in a liquid crystal such as substantially 55% 4-methoxybenzylidene-4'-n-butylaniline (MBBA) and substantially 45% 4-ethoxybenzylidene-4'-n-butylaniline by weight (EBBA).

A mixture of a nematic Schiff base liquid crystal comprising substantially 55% 4-methoxybenzylidene-4'-n-butylaniline and substantially 45% 4-ethoxybenzylidene-4'-n-butylaniline by weight, and 0.7 weight % of a bifunctional dopant selected from the above group combined with an uncalibrated amount of p-toluenesulfonic acid (TSA) produces the results shown in Table I.

TABLE I

| Dopant (0.7 weight %) | Contrast ratio at 25 volts 25°C. |
|---|---|
| m-aminophenol + TSA | 9 |
| p-aminophenol + TSA | 16 |
| 3-dimethylaminophenol + TSA | 9 |
| 4-amino-m-cresol[1.0%] + TSA | 11 |
| 4-hydroxypyridine + TSA | 8 |
| p-aminobenzoic acid + TSA | 12 |

Each of the dopants provides a useable contrast ratio. P-aminophenol is the preferred dopant from the group because it produced the best contrast ratio with the least reduction in the transition temperature at which the material passes from the nematic crystal state to the isotropic liquie state. For this reason, the effect of dopant concentrations on contrast ratio and cutoff frequency was investigated with respect to p-aminophenol and p-toluenesulfonic acid. This investigation was carried out using a nematic liquid crystal consisting of substantially 55% very pure 4-methoxybenzylidene-4′-n-butylaniline and substantially 45% very pure 4-ethoxybenzylidene-4′-n-butylaniline by weight, and adding carefully measured quantities of the dopants thereto. The results of this investigation conducted at 25 volts and 25°C. with a liquid crystal thickness of about 19 microns are given in Table II.

TABLE II

| Test Number | p-aminophenol (Weight %) | p-toluene sulfonic acid parts per million | Contrast ratio | Cutoff Frequency |
|---|---|---|---|---|
| 1 | none | none | 1.0 | <25 |
| 2 | .5 | none | 4 | <25 |
| 3 | none | 77 | 4 | ~100 |
| 4 | none | 120 | 7 | 100 |
| 5 | .2 | 120 | 14.4 | 225 |
| 6 | .38 | 92 | 11.2 | 180 |
| 7 | .4 | 120 | 15.5 | 270 |
| 8 | .5 | 180 | 17.8 | 330 |
| 9 | .51 | 191 | 16 | 400 |
| 10 | .63 | 120 | 14.8 | 360 |
| 11 | .95 | 77 | 18.2 | 330 |

From Table II it is seen that there are several dopant combinations which satisfy the expressed requirements. The doping in Test No. 9 is considered the best of those in the table because it yields the highest cutoff frequency with a contrast ratio of 16 vs. a maximum value of 18.2. The difference between contrast ratios of 16 and 18.2 is exceedingly difficult for a human observer to detect when the two cells are not placed side by side and operated simultaneously.

The table results further make it clear that it is the combination of dopants rather than either one separately which yields the desired results. Further there is no easily discerned correlation between the contrast ratio, the cutoff frequency and the dopant quantities.

The long term stability of the substantially 55% 4-methoxybenzylidene-4′-n-butylaniline and substantially 45% 4-ethoxybenzylidene-4′-n-butylaniline by weight liquid crystal when doped with p-aminophenol and p-toluenesulfonic acid has been established in a number of environmental tests. These tests were designed to determine the effects of oxygen, photochemical reactions, thermal reactions, moisture and electrical decomposition due to the excitation signal.

The effect of oxygen on the doped liquid crystal was determined by bubbling dry oxygen through the crystal in gas vials for 5 minutes and then immediately capping them to prevent oxygen loss and contamination. After 360 hours there was no visible change in the liquid crystal. (The crystal turns brown when it decomposes).

A sample of the doped crystal was sealed in a vacuum and exposed to ~$10^{17}$ quanta per second of ultraviolet light, about the same as sunlight. After 1100 hours there was no visible change.

A similar sample exposed to natural sunlight (combined heat and ultraviolet) for 1100 hours also produced no change.

A sample which was capped under nitrogen but not hermetically sealed turned dark brown after an exposure to sunlight for 700 hours, thus indicating decomposition of the liquid crystal. This decomposition is attributed to the combination of sunlight and the ingress of moisture into the capped bottle over a period of time.

3300 hours at 65°C. produced no visible change in a hermetically sealed sample. 24 hours at 125°C. also produced no change. However, after 24 hours at 150°C. the material was dark brown and the transition temperature at which it changed from nematic to isotropic had decreased.

At an applied voltage of 22.5 volts d.c. across a 19 micron cell, the liquid crystal fails in about 100 hours by forming voids and decreasing the transition temperature.

No change was detected after 1000 hours of application of a 45 volt a.c. signal.

Thus, a doped Schiff-base nematic liquid crystal has been developed which has the contrast ratio, cutoff frequency and long term stability which is needed for the production of liquid crystal display cells having highly acceptable characteristics under a.c. excitation.

We claim:

1. A dopant for a Schiff-base nematic liquid crystal proportionately comprising:
   one part by weight p-toluenesulfonic acid and between about 3.4 and 650 parts by weight of a bifunctional material selected from the group consisting of m-aminophenol, p-aminophenol, 3-dimethylaminophenol, 4-amino-m-cresol, 4-hydroxypyridine, and p-aminobenzoic acid.

2. A nematic liquid crystal composition comprising:
   a pure Schiff-base nematic liquid crystal;
   p-aminophenol present in a quantity in the range of 0.1 to 5.0 weight percent of the liquid crystal; and
   p-toluenesulfonic acid present in a concentration of less than 300 ppm by weight of the liquid crystal.

3. A nematic liquid crystal composition comprising:
   a nematic liquid crystal of substantially 55% 4-methoxybenzylidene-4′-n-butylaniline by weight and
   substantially 45% 4-ethoxybenzylidene-4′-n-butylaniline by weight;
   and a dopant comprising between 0.2 and 1.0% p-aminophenol by weight of the liquid crystal and p-toluenesulfonic acid present in a concentration of less than 300 ppm by weight of the liquid crystal.

4. The composition of claim 3 wherein the p-aminophenol weight % is substantially 0.51 and the p-toluenesulfonic acid concentration is between 180 ppm and 200 ppm.

5. A nematic liquid crystal mixture comprising
   a pure Schiff-base nematic liquid crystal, and
   a dopant comprising p-toluenesulfonic acid and a bifunctional material selected from the group consisting of m-aminophenol, p-aminophenol, 3-dimethylaminophenol, 4-amino-m-cresol, 4-hydroxypyridine, and p-aminobenzoic acid, said bifunctional dopant being present in a quantity in the range of 0.1 to 5.0 weight % of the liquid crystal and said p-toluenesulfonic acid being present in a concentration of less than 300 ppm by weight of the liquid crystal.

6. The nematic liquid crystal composition recited in claim 5 wherein said bifunctional material concentration is between about 0.2 and about 1.0 weight percent and said p-toluenesulfonic acid concentration is between about 77 and about 200 ppm by weight.

* * * * *